US007319989B2

(12) United States Patent
Athens et al.

(10) Patent No.: US 7,319,989 B2
(45) Date of Patent: Jan. 15, 2008

(54) METHOD AND SYSTEM FOR PROTECTION AGAINST REPLAY OF AN INDICIUM MESSAGE IN A CLOSED SYSTEM METER

(75) Inventors: G. Thomas Athens, Derby, CT (US); Robert A. Cordery, Danbury, CT (US); John A. Hurd, Lake Mary, FL (US); Maria P. Parkos, Southbury, CT (US); Roger J. Ratzenberger, Jr., Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 1034 days.

(21) Appl. No.: 10/378,785

(22) Filed: Mar. 4, 2003

(65) Prior Publication Data

US 2004/0177050 A1  Sep. 9, 2004

(51) Int. Cl.
*G06Q 99/00* (2006.01)

(52) U.S. Cl. .................. 705/62; 705/401; 705/408; 705/410; 705/60; 705/61

(58) Field of Classification Search ........ 705/401–410, 705/60–63
See application file for complete search history.

(56) References Cited

U.S. PATENT DOCUMENTS

| | | |
|---|---|---|
| 4,253,158 A | 2/1981 | McFiggans |
| 5,583,779 A | 12/1996 | Naclerio et al. |
| 5,606,613 A * | 2/1997 | Lee et al. ............... 705/62 |
| 5,680,456 A | 10/1997 | Baker et al. |
| 5,799,290 A | 8/1998 | Dolan et al. |
| 6,064,989 A | 5/2000 | Cordery et al. |
| 6,188,997 B1 | 2/2001 | Ratzenberger, Jr. et al. |
| 6,820,065 B1 * | 11/2004 | Naclerio ............... 705/401 |
| 7,117,363 B2 * | 10/2006 | Lincoln et al. ......... 713/175 |
| 2002/0046196 A1 * | 4/2002 | Ogg .................... 705/406 |
| 2002/0087493 A1 * | 7/2002 | Herbert ................ 705/406 |

FOREIGN PATENT DOCUMENTS

EP   0939383   *  9/1999

OTHER PUBLICATIONS

USPS, "Information-Based Indcia Program Performance Criteria for Information-Based Indicia and Security Architecture for Closed IBI Postage Metering Systems", Jan. 12, 1999.*
Tygar et al., "Cryptographic Postage Indcia", Jan. 6, 1998.*

* cited by examiner

*Primary Examiner*—Jalatee Worjloh
(74) *Attorney, Agent, or Firm*—Brian A. Lemm; Angelo N. Chaclas

(57) ABSTRACT

A method and system that protects against a replay attack in a closed system postage meter is provided. "Freshness" data is included along with each indicium message sent from the meter to the printer, thereby enabling the printer to detect "stale" indicium data, i.e., indicium data that was previously generated and is being replayed, and prohibit the printing of duplicate indicia. The freshness data includes a random nonce generated by the printer during initialization along with sequence data that the printer can verify against sequence data from the previous printed indicium. If in the current indicium message the nonce is different or the current sequence data is not greater than or equal to the sequence data from the previous printed indicium, indicating the current indicium data may have been previously generated and is a replay, the printer will not print the current indicium data.

41 Claims, 3 Drawing Sheets

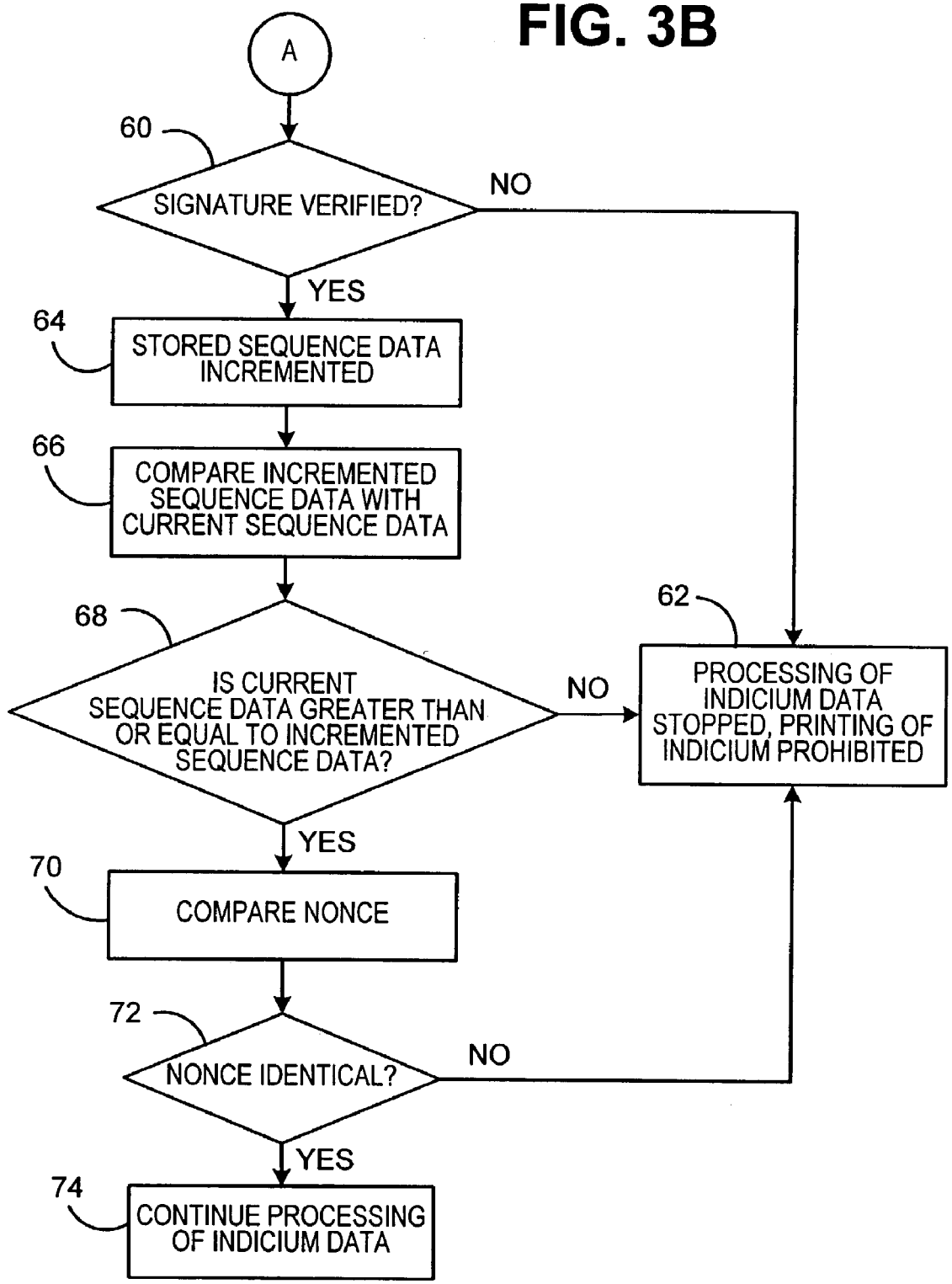

METHOD AND SYSTEM FOR PROTECTION AGAINST REPLAY OF AN INDICIUM MESSAGE IN A CLOSED SYSTEM METER

FIELD OF THE INVENTION

The invention disclosed herein relates generally to value dispensing systems, and more particularly to a method and system for protecting against replay of an indicium message in a closed postage metering system.

BACKGROUND OF THE INVENTION

One example of a value printing system is a postage evidencing system including an electronic postage meter and a printer for printing a postal indicia on an envelope or other mail piece. Electronic postage meters for dispensing postage and accounting for the amount of postage used are well known in the art. The meter supplies evidence of the postage dispensed by printing indicia which indicates the value of the postage on an envelope or the like. The typical postage meter stores accounting information concerning its usage in a variety of registers. An ascending register tracks the total amount of postage dispensed by the meter over its lifetime by being incremented in the amount of the postage dispensed after each transaction. A descending register tracks the amount of postage available for use. Thus, the descending register is decremented by the amount of postage dispensed after each transaction. When the descending register has been decremented to some value insufficient for dispensing postage, the postage meter inhibits further printing of indicia until the descending register is refilled with funds.

In a closed postage metering system, the system functionality is solely dedicated to metering activity. As defined by the United States Postal Service (USPS), a closed system is a system whose basic components are dedicated to the production of information-based indicia and related functions, similar to an existing, traditional postage meter. A closed system, which may be a proprietary device used alone or in conjunction with other closely related, specialized equipment, includes the indicia print mechanism. Thus, the postage meter and the printer have traditionally been located within a single secure housing. In this environment, the communications between the postage meter and the printer are typically physically secure. However, efforts have been undertaken to provide a closed postage metering system in which the postage meter is removable from a base that houses the printer. Thus, the meter and printer are physically separable from each other and are no longer contained within the same secure housing, making the physical communication lines between the postage meter and the printer generally non-secure.

There are problems, however, with mailing machines in which the meter is physically separable from the printer. For example, since the communication link between the meter and printer is not physically secure, the communication link is vulnerable to attack by unscrupulous people attempting to defraud the postal authority of funds. For example, one type of attack is referred to as a replay attack. In a replay attack, a monitoring/recording device, such as, for example, a personal computer or other device capable of monitoring and recording the data, e.g., an indicium message, being sent between the meter and printer, is inserted between the meter and printer. Such insertion can typically be performed by splicing into or otherwise altering the communication link. When a mail run is performed, the recording device logs all indicium messages, i.e., the data representative of postage indicium, generated by the meter that is being sent to the printer and then forwards the indicium message to the printer. The printer will process the indicium message and print the corresponding indicium onto a mail piece. Once the mail run is complete, the recorded data can then be replayed to the printer and the same indicium or indicia will be printed again, as the printer is unaware that the indicia data is not coming directly from the meter and is a recording of data previously processed. Thus, the indicium data could be replayed multiple times, with postage being accounted for and paid only once, i.e., for the initial mail run that was recorded by the recording device.

For example, a mail run of 2000 pieces could be separated into two 1000 piece batches. The first batch could be processed by the mailing machine, and the indicium data for each piece recorded by a recording device. The second batch could then be processed by replaying the recorded indicium data for the first batch, and printing duplicate indicium. The accounting will thus have only occurred for the first batch, thereby defrauding the postal authority of the funds for the second batch. Additionally, the recorded messages could be replayed multiple times, thereby further defrauding the postal authority of the funds for the mail pieces marked with the duplicate indicia.

It would be desirous to be able to protect against such replay attacks, thereby providing security to prevent the stealing of funds and/or services from the postal authority. Thus, there exists a need for a method and system that protects against a replay attack in a closed system postage meter.

SUMMARY OF THE INVENTION

The present invention alleviates the problems associated with the prior art and provides a method and system that protects against a replay attack in a closed system postage meter.

In accordance with the present invention, "freshness" data, i.e., data unique to each indicium, is included along with each indicium message sent from the meter to the printer, thereby enabling the printer to detect "stale" indicium data, i.e., indicium data that was previously generated and is being replayed, and prohibit the printing of duplicate indicia. The freshness data includes a random nonce generated by the printer during initialization that changes each time the system is power cycled. Thus, if the system is power cycled, a new nonce will be generated. If the nonce included with the current indicium message is not the same as the nonce for the current power-on session, the printer will not print the current indicium message. Thus, any indicium data generated during a previous power on session will not be printable. In addition, the freshness data includes sequence data that the printer can verify against sequence data from the previous printed indicium to ensure that the sequence data of the current indicium data is greater than or equal to the sequence data of the previous printed indicium. If the current sequence data is not greater than or equal to the sequence data from the previous printed indicium, indicating the current indicium data may have been previously generated and is a replay, the printer will not print the current indicium data.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIGS. 3A and 3B illustrate in flow chart form the processing performed during indicia generation and printing by the postage meter that protects against a replay attack in accordance with the present invention.

DETAILED DESCRIPTION OF THE PRESENT INVENTION

Figure 1:
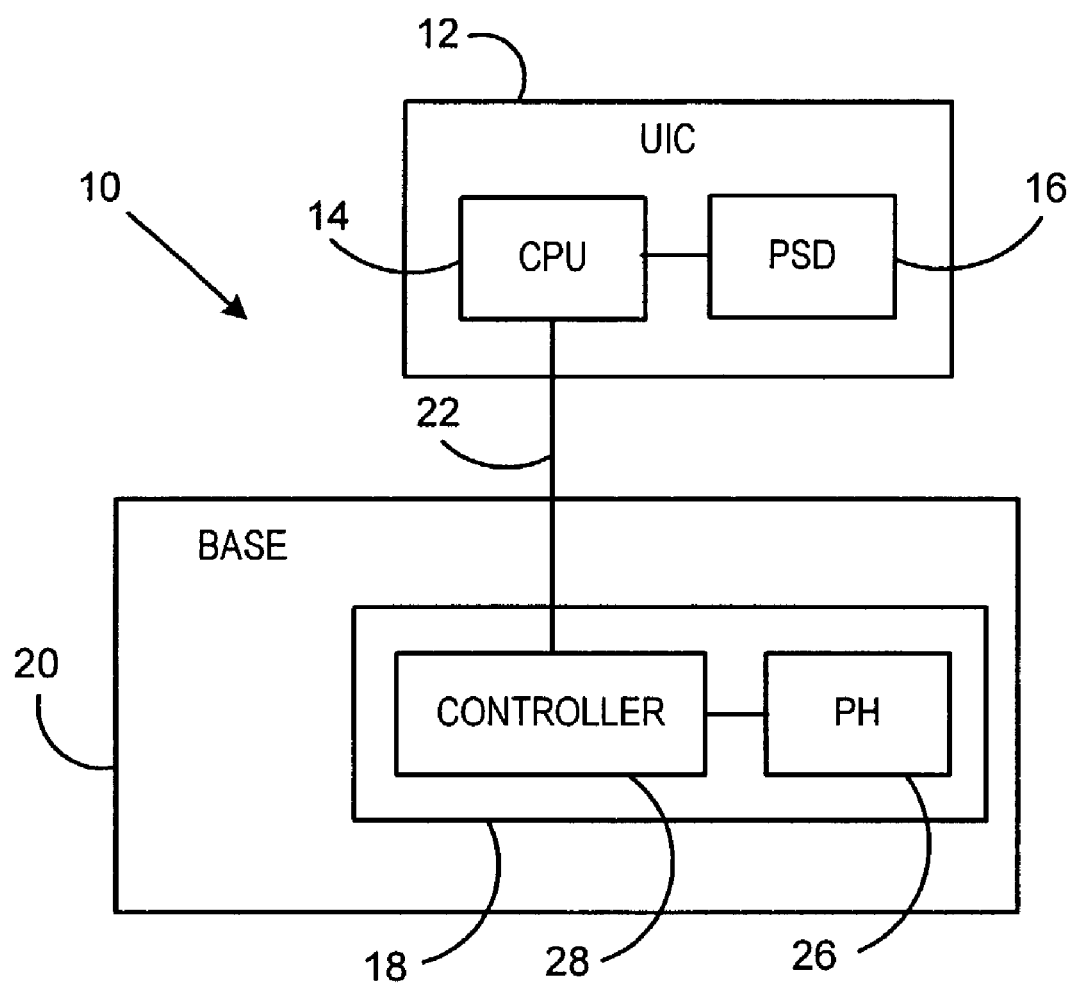
FIG. 1 illustrates in block diagram form a mailing machine that protects against a replay attack in accordance with the present invention.

In describing the present invention, reference is made to the drawings, wherein there is seen in FIG. 1 in block diagram form a mailing machine 10 that protects against a replay attack in accordance with the present invention. Mailing machine 10 is a closed system postage meter in which the meter is physically separable from the printer as described below. Mailing machine 10 includes a control panel device 12, hereinafter referred to as a User Interface Controller (UIC), that performs user interface and controller functions for the mailing machine 10. Specifically, the UIC 12, in conjunction with one or more processors or controllers, such as, for example, central processing unit 14, provides all user interfaces, executes control of the mailing machine 10, calculates postage for debit based upon rate tables, provides the conduit for an embedded Postal Security Device (PSD) 16 to transfer postage indicia to a printer 18, operates with peripherals for accounting, printing and weighing, and conducts communications with a data center for postage funds refill, software download, rates download, and market-oriented data capture. The PSD 16 contains one or more registers that store the accounting information concerning usage, such as, for example, an ascending register, descending register, piece count register, and the like. The UIC 12, in conjunction with the embedded PSD 16, provides the system meter that satisfies U.S. and international postal regulations regarding closed system information-based indicia postage (IBIP) meters. The UIC 12 is mounted to a base 20, such as, for example, by a docking station, connector or the like, that houses the printer 18. The base 20 processes a mail piece and provides it in the proper position for printing of the postage indicia by the print head 26 of printer 18 under control of the print head controller 28. Thus, an indicium message generated by the PSD 16 is sent, via communication link 22, to the controller 28 of the printer for processing, and the controller 28 generates signals sent to the print head 26 for printing the indicium. Since the UIC 12 is removable from the base 20 that includes the printer 18, the communication link 22 is not physically secure.

Figure 2:
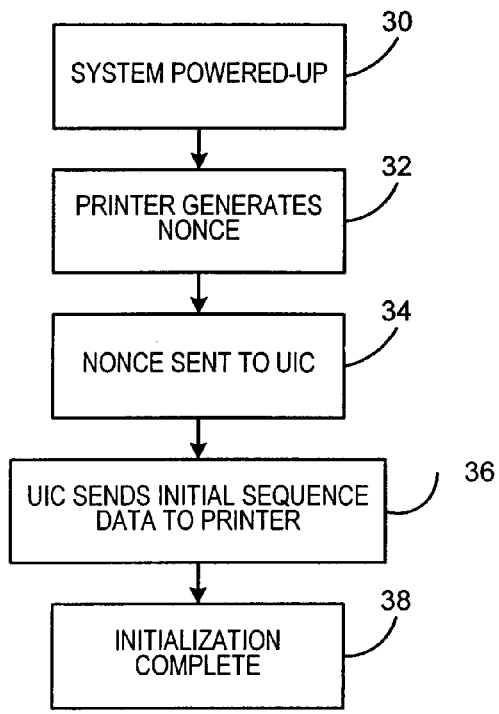
FIG. 2 illustrates in flow chart form the processing performed during power-up initialization of a postage meter that protects against a replay attack in accordance with the present invention.
Figure 3A:
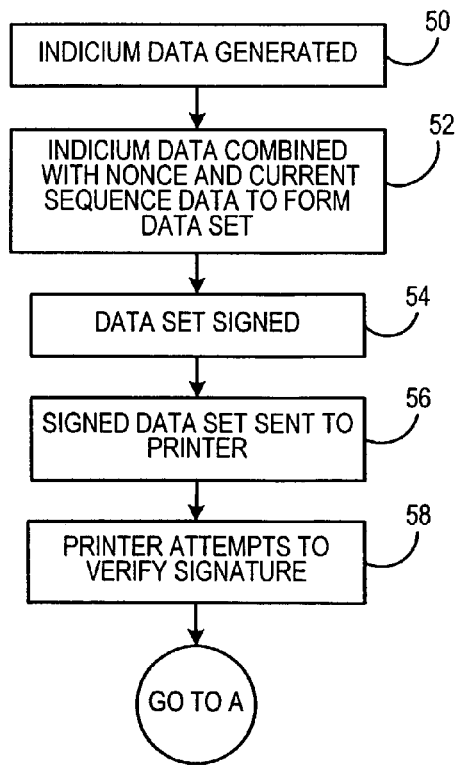

In accordance with the present invention, the mailing machine 10 protects against a replay attack of an indicium message as illustrated in FIGS. 2, 3A and 3B. Referring now to FIG. 2, there is illustrated in flow chart form the processing performed during power-up initialization of a postage meter that protects against a replay attack in accordance with the present invention. The method of FIG. 2 will be described with respect to the mailing machine 10 as illustrated in FIG. 1, but it should be understood that the present invention is not so limited and can be utilized by any type of postage meter or value dispensing system susceptible to a replay attack. As shown in FIG. 2, in step 30, the mailing machine 10 is powered-up and an initialization procedure will be performed. In step 32, the printer 18 generates a random nonce. The nonce could be generated, for example, by controller 28 in the printer 18, or by any type of random number generator (not shown) in the printer 18. The nonce could be, for example, a random number, alpha-numeric sequence, or any other type of unique identifying data. Preferably, the generated nonce is large enough such that it will not repeat for at least a very large number of cycles. Thus, each time the mailing machine 10 is cycled through a power-up procedure, a new nonce will be generated by the printer 18.

In step 34, the random nonce generated by the printer 18 is sent to the UIC 12. Preferably, the nonce is stored in the PSD 16, thereby protecting the security of the nonce. Alternatively, the nonce may be stored in a memory (not shown) in the UIC 16. Of course, to protect the security of the nonce, the memory must be secure to prevent any tampering with the nonce. The nonce is included in each indicium data provided by the PSD 16 to the printer 18, as further described below, to indicate "freshness" information. This will allow the printer 18 to detect any "stale" data, i.e., data generated during a previous power-on session, as the nonce between different power-on sessions will be different. As further described below, if the nonce included in indicium data from the PSD 16 is not the same as the current nonce generated during the most recent power-up procedure, the printer 18 will not print the indicium data. Optionally, the nonce may be cryptographically protected, such as, for example, by a digital signature generated by the printer 18, before being sent to the UIC 12. The digital signature could be generated, for example, by the controller 28 of printer 18. In this manner, any modification of the nonce before it reaches the UIC 12 can be detected upon verification of the signature by the UIC 12. The printer 18 can store in a non-volatile memory (not shown) a private cryptographic key that can be utilized in the generation of the digital signature. The corresponding public key, utilized to verify the signature generated using the private key, can be obtained in a traceable, verifiable manner to ensure the integrity of the key pair. This can be achieved using any type of well known key management methods, including, for example, standard Public Key Infrastructure (PKI) methods. Preferably, a key exchange between the printer 18 and PSD 16 occurs during initialization of the printer 18 and PSD 16.

In step 36, the UIC 12 sends initial sequence data to the printer 18. The initial sequence data is stored by the printer 18. The use of sequence data allows the printer 18 to perform a verification of indicium data sent to the printer 18 against the data from the previously printed indicium prior to printing the current indicium (as further described below). The initial sequence data can be, for example, the ascending register value from the PSD 16, the piece count value, or any other piece of data that is associated with and unique for every indicium. Preferably, the initial sequence data is cryptographically protected, such as, for example, by a digital signature generated by the PSD 16. In this manner, the sequence data can be authenticated and verified by the printer 18, using the corresponding public key of the PSD 16. The PSD 16 stores a private cryptographic key that can be utilized in the generation of the digital signature. The corresponding public key, utilized to verify the signature generated using the private key, can be obtained in a traceable, verifiable manner to ensure the integrity of the key pair. This can be achieved using any type of well known key management methods, including, for example, standard Public Key Infrastructure (PKI) methods. As noted above, a key exchange between the printer 18 and PSD 16 preferably occurs during initialization of the printer 18 and PSD 16. In step 38, the initialization of the mailing machine 10 is completed and the mailing machine 10 is ready to process mail pieces.

Referring now to FIGS. 3A and 3B, there is illustrated in flow chart form the processing performed during indicia generation and printing by a postage meter that protects against a replay attack in accordance with the present invention. The method of FIGS. 3A and 3B will be described with respect to the mailing machine 10 as illustrated in FIG. 1, but it should be understood that the present invention is not so limited and can be utilized by any type of postage meter or value dispensing system susceptible to a replay attack.

As shown in FIG. 3A, in step 50 the PSD 16 generates the indicium data for a mail piece. The exact procedure for the generation of the indicium data and its content is not necessary for an understanding of the present invention, and therefore no further description is necessary. In step 52, the indicium data is combined with the nonce, received from the printer 18 in step 34 of FIG. 2, and the current sequence data to form a data set. The current sequence data is the current value of the data, as updated by the generated indicium, being utilized for verification. Thus, the current sequence data would be the current value of the ascending register, the piece count value, or other piece of data being utilized as the sequence data.

Optionally in step 54, the data set formed in step 52 is preferably digitally signed by the PSD 16 using its private key. It should be noted that some postal requirements currently require a digital signature with respect to the indicium data. The specific data that must be signed is specified by the postal authority, and may not contain the current sequence data or the nonce. In this situation, the data set would be oversigned with a second digital signature. Thus, the indicium data, required by the postal regulations to be signed, would be signed with a first signature, and the data set, i.e., the signed indicium data, the current sequence data and the nonce, would be signed again. Preferably, the second signature utilizes the same private key for signing as the first signature. In step 56, the data set, or if signed in step 54, the signed data set, is sent to the printer 18 via the UIC 12.

In step 58, when the printer 18 has received the signed data set, the printer 18 will attempt to verify the signature of the data set using the corresponding public key of the PSD 16. Verification could be performed, for example, by the controller 28 of printer 18. Verification of the signature provides assurance that the incoming data set has not been tampered with or altered and that it is originating from the PSD 16 that was connected when the mailing machine 10 was powered-up. Thus, for example, if the data set has been altered in any manner the signature will not be verified. Additionally, if the data set was generated by a PSD other than the PSD 16 coupled to the printer 18 at power-up, the signature will also not be verified, as the private/public key pair will be different, and the printer 18 will not have the appropriate public key. Referring now to FIG. 3B, the processing from FIG. 3A continues in step 60, where it is determined by the printer 18 if the signature of the data set is verified. If in step 60 it is determined that the signature is not verified, then in step 62, further processing of the indicium data will not occur, printing of the indicium data will be prohibited and the printer 18 will not print the indicium data. Optionally, if desired, in step 62 the printer 18 could send a signal to the UIC 12 indicating the processing has stopped and the indicium data will not be printed. UIC 12 could then display a message to the operator indicating the operating status. If the data set is not signed, then it should be understood that the processing as illustrated in steps 54, 58 and 60 need not be performed.

If in step 60 it is determined that the signature is verified, then in step 64 the sequence data stored in the printer 18 from the previous printed indicium or initial sequence data (if the data set is associated with the first indicium to be printed for the session) will be updated to include the indicium in the current data set. Suppose, for example, the ascending register value is used as the sequence data. In step 36 of FIG. 2, the initial value of the ascending register was provided by the PSD 16 to the printer 18 and stored by the printer 18. In step 64 the initial stored value of the ascending register will be incremented by the amount of postage to be printed from the data set received from the PSD 16. Thus, if the ascending register had an initial value of $100.00, and the postage amount of the indicium in the data set received by the printer 18 has a value of $1.00, the stored sequence data will be incremented to $101.00. The incrementing could be performed, for example, by controller 28. In step 66, the value of the incremented sequence data is compared to the current sequence data contained in the received data set. The comparison could be performed, for example, by controller 28. Recall that the current sequence data includes the generated indicium data. Thus, in the above example, the current sequence data will be the current ascending register value, which will be $101.00. In step 68 it is determined, by the controller 28, for example, if the current sequence data in the received data set is greater than or equal to the incremented sequence data.

If in step 68 it is determined that the current sequence data in the received data set is not greater than or equal to the incremented sequence data, then in step 62 further processing of the indicium data will not occur, printing of the indicium data will be prohibited and the printer 18 will not print the indicium data. For example, the controller 28 could prevent the indicium data from being sent to the print head 26. Stopping the further processing of the indicium data and prohibiting the printing of the indicium data in step 62 only if the current sequence data is less than the incremented sequence (NO result in step 68) allows for recovery situations in which the PSD 16 has output indicium data but the data was not received or printed by the printer 18. For example, if a jam occurs with the mail piece and an indicium is not printed, or if a communication error occurs between the printer 18 and UIC 12 and the indicium data is never received, the sequence data stored in the printer 18 will not be updated and any subsequent current sequence data received from the PSD 16 will always be greater than the incremented sequence data for all subsequent indicium data until the system is re-initialized.

If a value other than the ascending register value is used as the sequence data, the processing as illustrated in steps 64-68 would be similar for the other sequence data. Optionally, for even greater security, the sequence data can include multiple values, such as, for example, both the ascending register value and the piece count value. Thus, if indicium data from a previous session, or even earlier in the same session, is attempted to be replayed, the current sequence data included in the data set will be less than the incremented sequence data, resulting in the printer 18 not printing the replay of the indicium data.

If in step 68 it is determined that the current sequence data in the received data set is greater than or equal to the incremented sequence data, then processing continues in step 70 where the nonce included in the data set is compared, utilizing the controller 28, for example, with the nonce generated and sent to the UIC 12 during the initialization procedure (steps 32 and 34 of FIG. 2). In step 72 it is determined if the nonce included in the data set is identical to the nonce generated during the initialization procedure. If the nonce is not identical, indicating the mailing machine 10 has been power cycled since the generation of the data set, then in step 62 further processing of the indicium data will not occur, printing of the indicium data will be prohibited and the printer 18 will not print the indicium data. Since a new nonce is generated each time the mailing machine 10 is power cycled, i.e., during each power-up initialization procedure, any indicium data generated during a previous power-on session will not be printed by the printer 18. If in step 72 it is determined that the nonce included in the data set is identical to the nonce generated during initialization, then in step 74 the processing of the indicium data will continue and the indicium data can be printed by the printer 18. The processing of the indicium data in step 74 includes replacing the stored sequence data in the printer 18 with the incremented sequence data, thereby updating the sequence data to include the indicium data in the data set just processed. The continued processing of the indicium data in step 74 can also include printing the indicium data. Preferably, the stored sequence data is not updated until after the indicium data is printed by the printer 18.

It should be understood that the specific sequence of the above steps 58-72 need not be as described, but can be performed in any sequence desired. For example, the comparison of the nonce could be performed before the comparison of the incremented sequence data to the current sequence data, or the signature verification. Additionally, the processing could be performed by the controller 28, or a separate processor within the printer 18.

Thus, according to the present invention, a method and system that protects against a replay attack in a closed system postage meter is provided. By providing the printer 18 with "freshness" data, i.e., data unique to each indicium, for each indicium message sent from the PSD 16 to the printer 18, the printer 18 can detect "stale" indicium data, i.e., indicium data that was previously generated, and prohibit the printing of duplicate indicia. Those skilled in the art will also recognize that various modifications can be made without departing from the spirit of the present invention. For example, the processing as illustrated in FIGS. 2, 3A and 3B can be performed utilizing software, hardware, firmware or any combination thereof. As another example, it should be understood that although the present invention was described with respect to a postage metering system, the present invention is not so limited and is applicable to any type of value metering system or controlled printing environment where it is desired to prevent print data generated by a processor from being replayed and printed multiple times by a printer.

While preferred embodiments of the invention have been described and illustrated above, it should be understood that they are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A mailing machine comprising:
    a meter to generate indicium data and combine the indicium data with freshness data to form a data set, the freshness data including current sequence data that includes a register value of the meter that is associated with each indicium data and incremented with each indicium data that is generated; and
    a printer coupled to the meter, the printer to receive the data set from the meter, increment sequence data stored at the printer to include the indicium data in the data set and verify the freshness data of the data set by determining if the current sequence data in the data set is greater than or equal to the incremented sequence data stored at the printer, and to print the indicium data if the freshness data is verified and not print the indicium data if the freshness data is not verified.

2. The mailing machine of claim 1, wherein the printer generates a nonce during initialization of the printer and the meter and provides the nonce to the meter, and the freshness data includes the nonce.

3. The mailing machine of claim 2, wherein the nonce is a random number.

4. The mailing machine of claim 2, wherein the nonce is an alpha-numeric sequence.

5. The mailing machine of claim 2, wherein a new nonce is generated each time the mailing machine is power cycled.

6. The mailing machine of claim 2, wherein the nonce includes a digital signature.

7. The mailing machine of claim 2, wherein the printer verifies the freshness data by comparing the nonce in the freshness data to the nonce generated during initialization.

8. The mailing machine of claim 1, wherein the current sequence data includes an ascending register value.

9. The mailing machine of claim 1, wherein the current sequence data includes a piece count register value.

10. The mailing machine of claim 1, wherein the meter digitally signs the data set before the data set is sent to the printer.

11. The mailing machine of claim 10, wherein the printer verifies the digital signature of the data set.

12. The mailing machine of claim 1, wherein the meter sends initial sequence data to the printer during initialization of the meter and the printer.

13. The mailing machine of claim 12, wherein the initial sequence data includes a digital signature.

14. The mailing machine of claim 1, wherein the meter is removable from the printer.

15. A method for a printer to process print data generated by a processor comprising:
    receiving a data set from the processor, the data set including print data and freshness data, the freshness data including current sequence data that is incremented with each print data generated by the processor, the current sequence data being a current value of initial sequence data previously received by the printer from the processor;
    verifying the freshness data at the printer by incrementing sequence data stored at the printer to include the print data, the sequence data stored at the printer being initially based on the initial sequence data received from the processor, and determining if the current sequence data in the data set is greater than or equal to the incremented sequence data stored at the printer;

processing the print data if the freshness data is verified; and discontinuing processing of the print data if the freshness data is not verified.

16. The method of claim 15 further comprising:

generating a nonce at the printer; and sending the nonce from the printer to the processor.

17. The method of claim 16, wherein a new nonce is generated each time the processor and printer are initialized.

18. The method of claim 16, wherein the nonce is a random number.

19. The method of claim 16, wherein the nonce is an alpha-numeric sequence.

20. The method of claim 16, wherein sending the nonce further comprises:

signing the nonce with a digital signature; and sending the signed nonce to the processor.

21. The method of claim 16, wherein the freshness data includes the nonce.

22. The method of claim 21, wherein verifying the freshness data further comprises:

determining if the nonce in the data set is identical to the nonce generated at the printer.

23. The method of claim 15, wherein the current sequence data is a register value.

24. The method of claim 15, wherein the data set is signed with a digital signature, and verifying the freshness data further comprises:

verifying the signature of the data set.

25. The method of claim 15, wherein the processor includes a postage meter, and the print data is indicium data generated by the postage meter.

26. The method of claim 25, wherein the current sequence data includes an ascending register value of the postage meter.

27. The method of claim 25, wherein the current sequence data includes a piece count register value of the postage meter.

28. The method of claim 15, wherein processing the print data further comprises:

printing the print data.

29. A method for processing indicium data in a mailing machine including a meter and a printer comprising:

generating the indicium data at the meter;

combining the indicium data with current sequence data to form a data set, the sequence data including a register value of the meter that is incremented with each indicium data generated;

sending the data set from the meter to the printer;

incrementing sequence data stored at the printer to include the indicium data in the data set;

verifying the current sequence data in the data set is not less than the incremented sequence data;

continuing processing of the indicium data if the current sequence data is verified; and discontinuing processing of the indicium data if the current sequence data is not verified.

30. The method of claim 29, wherein the current sequence data includes an ascending register value of the meter.

31. The method of claim 29, wherein the current sequence data includes a piece count register value of the meter.

32. The method of claim 29, wherein combining the indicium data further comprises:

combining the indicium data with the current sequence data and a nonce generated by the printer to from a data set.

33. The method of claim 32, further comprising:

verifying that the nonce in the data set is identical to the generated nonce, wherein if the nonce is not verified, processing of the indicium data is discontinued.

34. The method of claim 32, wherein a new nonce is generated at the printer each time the printer is power cycled.

35. The method of claim 32, wherein the nonce is a random number.

36. The method of claim 32, wherein the nonce is an alpha-numeric sequence.

37. The method of claim 29, further comprising:

signing the data set with a digital signature; and sending the signed data set from the meter to the printer.

38. The method of claim 37, further comprising:

verifying the signature of the signed data set at the printer, wherein if the signature is not verified, processing of the indicium data is discontinued.

39. The method of claim 29, wherein processing of the indicium data further comprises:

printing the indicium data on a mail piece.

40. The method of claim 29, wherein discontinuing processing of the indicium data further comprises:

prohibiting printing of the indicium data.

41. The method of claim 40, further comprising:

indicating processing of the indicium data has been discontinued.

* * * * *